(12) United States Patent
Harase et al.

(10) Patent No.: US 7,618,058 B2
(45) Date of Patent: Nov. 17, 2009

(54) AIRBAG CONTROL APPARATUS

(75) Inventors: Shinichi Harase, Tokyo (JP); Toshiyuki Yamashita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 175 days.

(21) Appl. No.: 11/663,746

(22) PCT Filed: Nov. 9, 2005

(86) PCT No.: PCT/JP2005/020543

§ 371 (c)(1),
(2), (4) Date: Mar. 26, 2007

(87) PCT Pub. No.: WO2006/082680

PCT Pub. Date: Aug. 10, 2006

(65) Prior Publication Data

US 2007/0267848 A1 Nov. 22, 2007

(30) Foreign Application Priority Data

Feb. 4, 2005 (JP) ............................. 2005-029308

(51) Int. Cl.
*B60R 21/16* (2006.01)
(52) U.S. Cl. ..................................... 280/735
(58) Field of Classification Search ................. 280/735
See application file for complete search history.

(56) References Cited

U.S. PATENT DOCUMENTS 6,113,138 A 9/2000 Hermann et al.
6,256,563 B1 7/2001 Blank et al.
7,011,175 B2 * 3/2006 Link et al. ................... 180/274
2002/0123835 A1 9/2002 Oswald et al.
2005/0000748 A1 1/2005 Link et al.

FOREIGN PATENT DOCUMENTS

| DE | 196 51 123 C1 | 6/1998 |
|---|---|---|
| DE | 197 19 454 A1 | 1/1999 |
| DE | 100 17 084 A1 | 8/2001 |
| DE | 101 02 996 C1 | 8/2002 |
| DE | 101 55 662 A1 | 5/2003 |
| JP | 07-165004 A | 6/1995 |
| JP | 2000-335364 A | 12/2000 |
| JP | 2001-18744 A | 1/2001 |
| JP | 2001-138856 A | 5/2001 |
| JP | 2002-178873 A | 6/2002 |
| JP | 2003-327073 A | 11/2003 |
| JP | 2004-130842 A | 4/2004 |
| WO | WO-03/042006 A1 | 5/2003 |

* cited by examiner

*Primary Examiner*—Faye M. Fleming
(74) *Attorney, Agent, or Firm*—Birch, Stewart, Kolasch & Birch, LLP

(57) ABSTRACT

An airbag control apparatus has an acceleration detecting section 11 for detecting acceleration in the longitudinal direction and lateral direction of a vehicle 1; a collision decision section 12 for making a decision about a frontal collision and side-impact collision of the vehicle in response to the detection outputs of the acceleration detecting section 11; and a driving section 13 for inflating airbags 14 mounted in the front or sides of the vehicle in response to the decision output of the collision decision section 12. The collision decision section suppresses the decision about the side-impact collision in accordance with collision information in the longitudinal direction of the vehicle contained in the detection outputs of the acceleration detecting section.

6 Claims, 4 Drawing Sheets

AIRBAG CONTROL APPARATUS

TECHNICAL FIELD

The present invention relates to an airbag control apparatus for controlling inflation of an airbag mounted on a vehicle, and more particularly to an airbag control apparatus that suppresses an accidental inflation of side-impact collision airbags caused by a collision other than a side-impact collision, such as a frontal collision.

BACKGROUND ART

Conventionally, such control has been performed which makes a decision about the magnitude of the lateral component of collision acceleration of a vehicle with side-impact sensors mounted at sides of front seats (or rear seats), and inflates side airbags/curtain airbags when the impact is great (see Patent Document 1, for example).

Alternatively, a technique is known which controls frontal collision airbags when the integral of the outputs of longitudinal acceleration sensors is equal to or greater than a low threshold value and equal to or less than a high threshold value, and when the piecewise integral of the outputs of lateral acceleration sensors is equal to or greater than a low threshold value (see Patent Document 2, for example). Another technique is known which prevents the inflation of airbags at a non-head-on collision (see Patent Document 3, for example).

Patent Document 1: Japanese patent application laid-open No. 2001-138856.

Patent Document 2: Japanese patent application laid-open No. 2004-130842.

Patent Document 3: Japanese patent application laid-open No. 7-165004/1995.

The foregoing conventional apparatuses carry out the inflation control of the airbags according to the magnitude of the right and left components in the lateral direction. Thus, even in case of a frontal collision, the airbags can inflate if a great impact is input in the lateral direction. In the frontal collision, since occupants normally move forward, the inflation of the side airbags has little occupant protecting effect, with presenting a problem of imposing a high repair cost on a user.

The present invention is implemented to solve the foregoing problems. Therefore, it is an object of the present invention to provide an airbag control apparatus capable of preventing the accidental inflation of side airbags in the case where the occupant protecting effect is small.

DISCLOSURE OF THE INVENTION

An airbag control apparatus in accordance with the present invention includes: acceleration detecting means for detecting acceleration in a longitudinal direction and lateral direction of a vehicle; collision decision means for making a decision about a frontal collision and side-impact collision of the vehicle in accordance with detection outputs of the acceleration detecting means; and driving means for inflating airbags mounted in the front or sides of the vehicle in response to a decision output of the collision decision means, wherein the collision decision means suppresses the decision about the side-impact collision in accordance with collision information in the longitudinal direction of the vehicle, which is included in the detection outputs of the acceleration detecting means.

The present invention offers an advantage of being able to prevent an accidental inflation of side airbags or curtain airbags in a case where the occupant protecting effect is small in the frontal collision of the vehicle.

BEST MODE FOR CARRYING OUT THE INVENTION

The best mode for carrying out the invention will now be described with reference to the accompanying drawings to explain the present invention in more detail.

Embodiment 1

Figure 1:
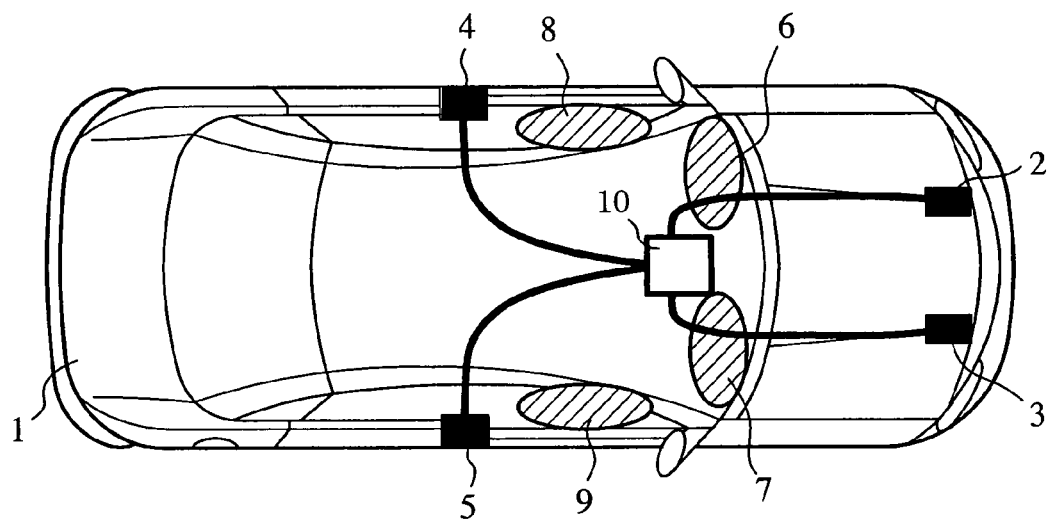
FIG. 1 is a diagram showing an entire configuration of an airbag control apparatus of an embodiment 1 in accordance with the present invention.

FIG. 1 is a diagram showing a configuration of the airbag control apparatus of an embodiment 1 in accordance with the present invention.

In FIG. 1, the airbag control apparatus of the embodiment 1 in accordance with the present invention has: front-impact sensors (forward acceleration detecting means) 2 and 3 which are mounted in the front of a vehicle 1 and serve as longitudinal acceleration sensors for detecting the longitudinal acceleration of the vehicle 1; side-impact sensors (lateral acceleration detecting means) 4 and 5 which are mounted at right and left sides of the vehicle 1 and serve as lateral acceleration sensors for detecting the lateral acceleration of the vehicle 1; front airbags 6 and 7 serving as frontal collision airbags for protecting occupants in a frontal collision; side airbags 8 and 9 serving as side-impact collision airbags for protecting the occupants in a side-impact collision; and a main ECU (Electric Control Unit) 10 which is mounted at the center of the vehicle 1 for carrying out driving control of the front airbags 6 and 7 and side airbags 8 and 9 in response to the detection outputs of the front-impact sensors 2 and 3 and side-impact sensors 4 and 5, respectively.

Figure 2:
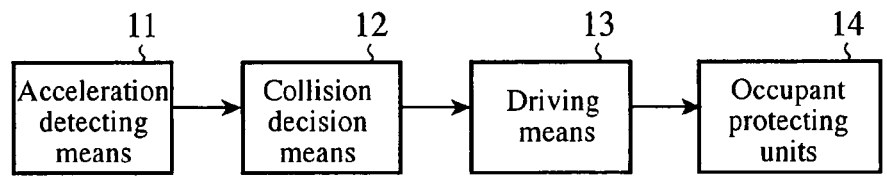
FIG. 2 is a block diagram showing a configuration of the airbag control apparatus of the embodiment 1 in accordance with the present invention.

FIG. 2 shows a concrete circuit configuration of the airbag control apparatus of the embodiment 1 in accordance with the present invention. It has: an acceleration detecting means 11 which includes the impact sensors 2 and 3 and 4 and 5 mounted in the front and on the right and left sides of the vehicle 1, and converts the impacts on the vehicle 1 to voltage signals; a collision decision means (collision decision driving means) 12 for deciding the magnitude of the impact acceleration by calculating the voltage signals from the detecting means 11; a driving means (collision decision driving means) 13 for generating a driving signal for firing the airbags in response to collision decision result from the collision decision means 12; and an occupant protecting apparatus 14 including the front airbags 6 and 7 and side airbags 8 and 9 started by the driving signal from the driving means 13. Here, the collision decision means 12 and driving means 13 practically constitute the main ECU 10 of FIG. 1, which is composed of a microcomputer and electronic components. In addition, the collision decision means 12 normally decides the magnitude of the impact in accordance with the integral of the acceleration detection output waveform (equivalent to velocity). More specifically, it makes a decision that the impact is great when the integral exceeds a predetermined threshold value. In this case, the driving means 13 outputs the driving signal for firing the airbags in response to the collision decision result to start the airbags 14.

Figure 3:
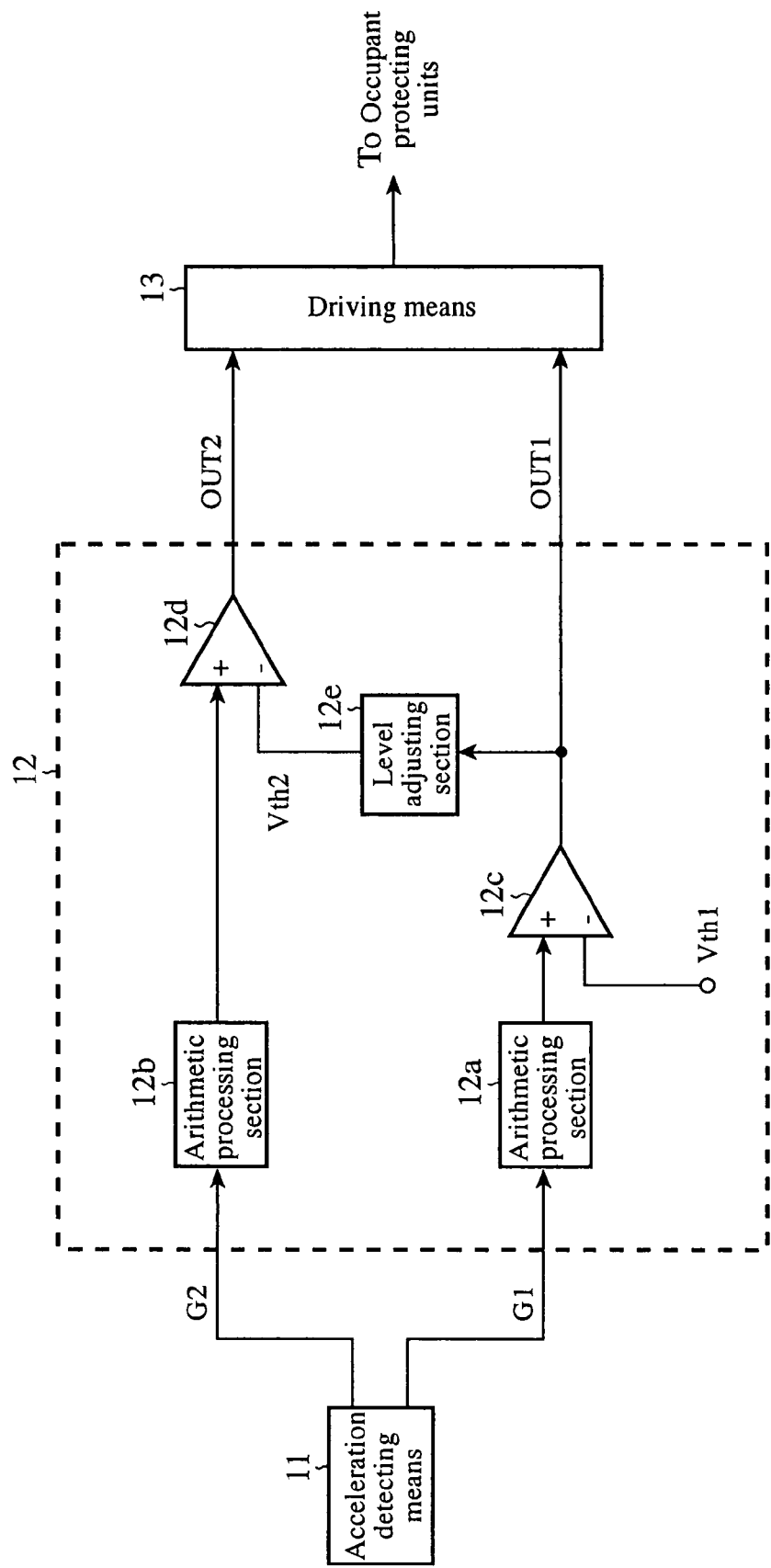
FIG. 3 is a block diagram showing a detailed configuration of a major portion of the airbag control apparatus of the embodiment 1 in accordance with the present invention.

FIG. 3 is a diagram showing a concrete circuit configuration of the collision decision means 12 of FIG. 2. The collision decision means 12 has: an arithmetic processing section 12a for carrying out, when a frontal collision occurs, arithmetic processing of the magnitude of the acceleration G1 detected by the acceleration detecting means 11 as the acceleration information in the longitudinal direction of the vehicle; an arithmetic processing section 12b for carrying out, when a side-impact collision occurs, arithmetic processing of the magnitude of the acceleration G2 detected by the acceleration detecting means 11 as the acceleration information in the lateral direction of the vehicle; a comparator 12c for comparing the output value the arithmetic processing section 12a with a predetermined frontal collision decision threshold value Vth1, and for causing, when the output value of the arithmetic processing section 12a is greater than the threshold value Vth1, the driving means 13 to generate a front airbag firing driving signal by the output signal OUT1 of the comparator 12c; a comparator 12d for comparing the output value the arithmetic processing section 12b with a side-impact collision decision threshold value Vth2 variable in accordance with the output value of the comparator 12c, and for causing, when the output value of the arithmetic processing section 12b is greater than the threshold value Vth2, the driving means 13 to generate a side airbag firing driving signal by the output signal OUT2 of the comparator 12d; and a level adjusting section 12e for adjusting the level of the threshold value Vth2 of the comparator 12d in accordance with the value of the output signal OUT1 of the comparator 12c.

Here, as for the side-impact collision decision threshold value Vth2 of the comparator 12d, it is raised from the Low level to the High level at the timing when the acceleration G1 in the longitudinal direction of the vehicle increases, that is, when the frontal collision decision is turned on in the present embodiment. In other words, it is raised by the level adjusting section 12e, to which the output of the comparator 12c is applied, at the time when the output value the arithmetic processing section 12a exceeds the frontal collision decision threshold value Vth1 of the comparator 12c. Such a configuration makes it possible to prevent the accidental inflation of the side airbags 8 and 9 by temporarily raising the side-impact collision decision threshold value Vth2 of the comparator 12d in the frontal collision.

Next, the operation will be described with reference to FIG. 4 and FIG. 5.

Figure 4:
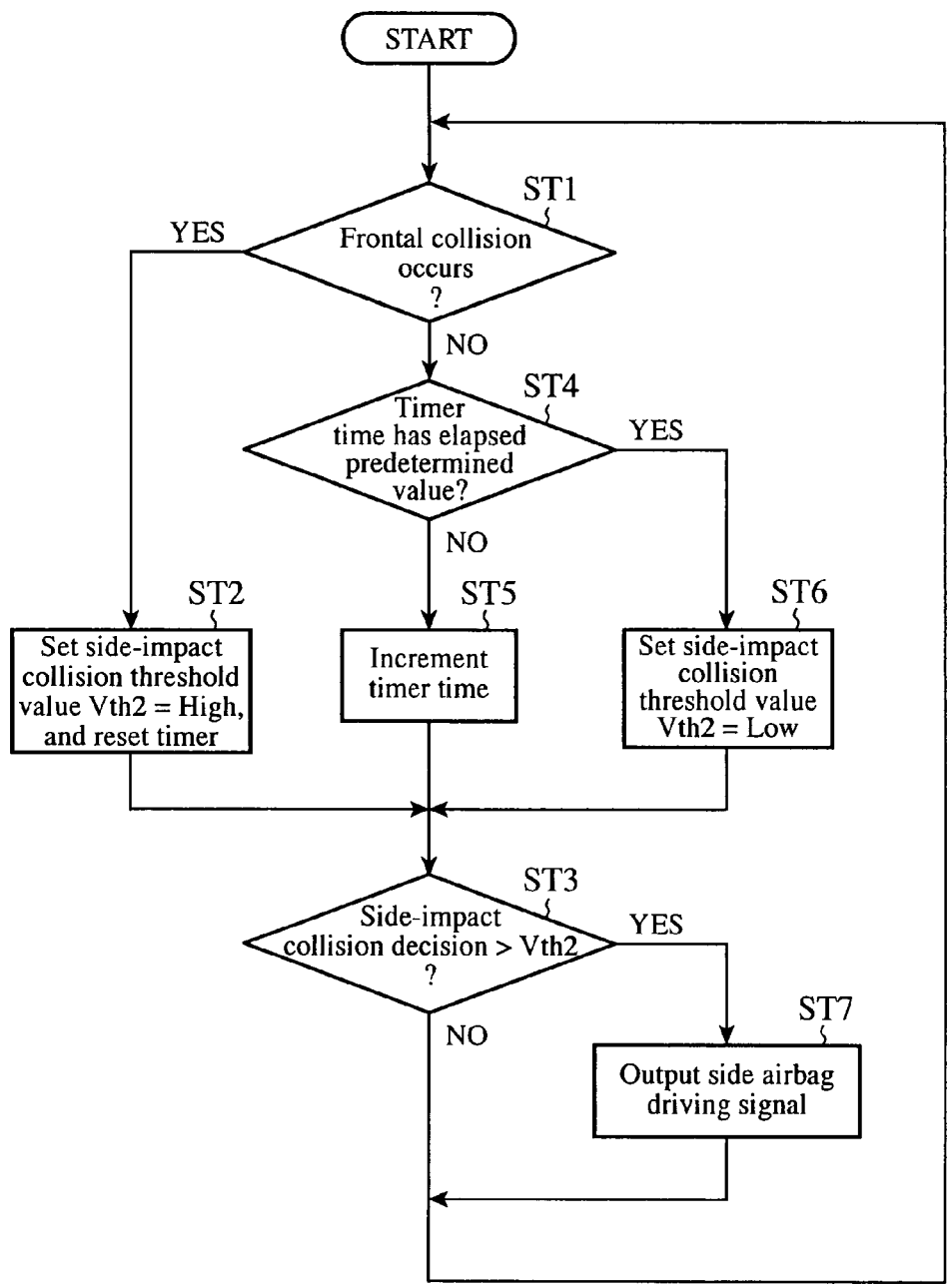
FIG. 4 is a flowchart illustrating the operation of the airbag control apparatus of the embodiment 1 in accordance with the present invention.

FIG. 4 is a flowchart illustrating the arithmetic processing of the collision decision calculated in the collision decision means 12 composed of a microcomputer. It is assumed here that the microcomputer makes a decision about the inflation/non-inflation of the airbags in accordance with the acceleration information sampled at every several hundred microsecond interval.

At step ST1 in FIG. 4, the arithmetic processing section 12a in the collision decision means 12 processes the acceleration information in the longitudinal direction of the front-impact sensors 2 and 3 (FIG. 1) detected by the acceleration detecting means 11, and the comparator 12c compares the output value of the arithmetic processing section 12a with the frontal collision decision threshold value Vth1 to make a frontal collision decision. If a frontal collision occurs, the side-impact collision decision threshold value Vth2 of the comparator 12d in the collision decision means 12, which is normally placed at the Low level, is raised to the High level at step ST2. In addition, a timer time is reset in such a manner that the timing at which the threshold value Vth2 is switched defines the time zero.

At the next step ST3, the arithmetic processing section 12b in the collision decision means 12 carries out the processing of the acceleration information in the lateral direction of the side-impact sensors 4 and 5 (FIG. 1) detected by the acceleration detecting means 11. In addition, the comparator 12d compares the output value of the arithmetic processing section 12b with the side-impact collision decision threshold value Vth2 to make a side-impact collision decision about the occurrence of a side-impact collision. At this stage, however, since the side-impact collision decision threshold value Vth2 of the comparator 12d has been raised to the High level at step ST2, the side-impact collision is not detected, and the processing is returned to step ST1. Subsequently, at step ST4, the threshold value Vth2 of the comparator 12d is held at the High level for a predetermined period after the frontal collision decision occurs.

At step ST4, after the decision about the frontal collision (No at step ST1), if the timer time is within the predetermined period, several hundred milliseconds, for example, the timer time is incremented at step ST5 without changing the side-impact collision decision threshold value Vth2 of the comparator 12d. Thus, since the side-impact collision decision threshold value Vth2 is also at the High level at step ST2 in this case, the side-impact collision is not detected at step ST3, and the processing is returned to step ST1. In this way, a decision is made at step ST4 as to whether the timer time exceeds the predetermined period or not, and unless it exceeds, the processing of incrementing the timer time at step ST5 is repeated at every several hundred millisecond interval. If the timer time exceeds a predetermined value, that is, if it exceeds the predetermined period after the frontal collision, the level adjusting section 12e returns the side-impact collision decision threshold value Vth2 of the comparator 12d to its original value (Low level) at step ST6.

Subsequently, according to the side-impact collision decision threshold value Vth2 returned to its original value (Low level) in this way, the collision decision means 12 makes the side-impact collision decision at step ST3. If the output value of the arithmetic processing section 12b is greater than the side-impact collision decision threshold value Vth2 of the comparator 12d (Low level), the comparator 12d causes the driving means 13 to generate the side airbag firing driving signal in response to the output signal OUT2 of the comparator 12d to inflate the side airbags 8 and 9.

Figure 5:
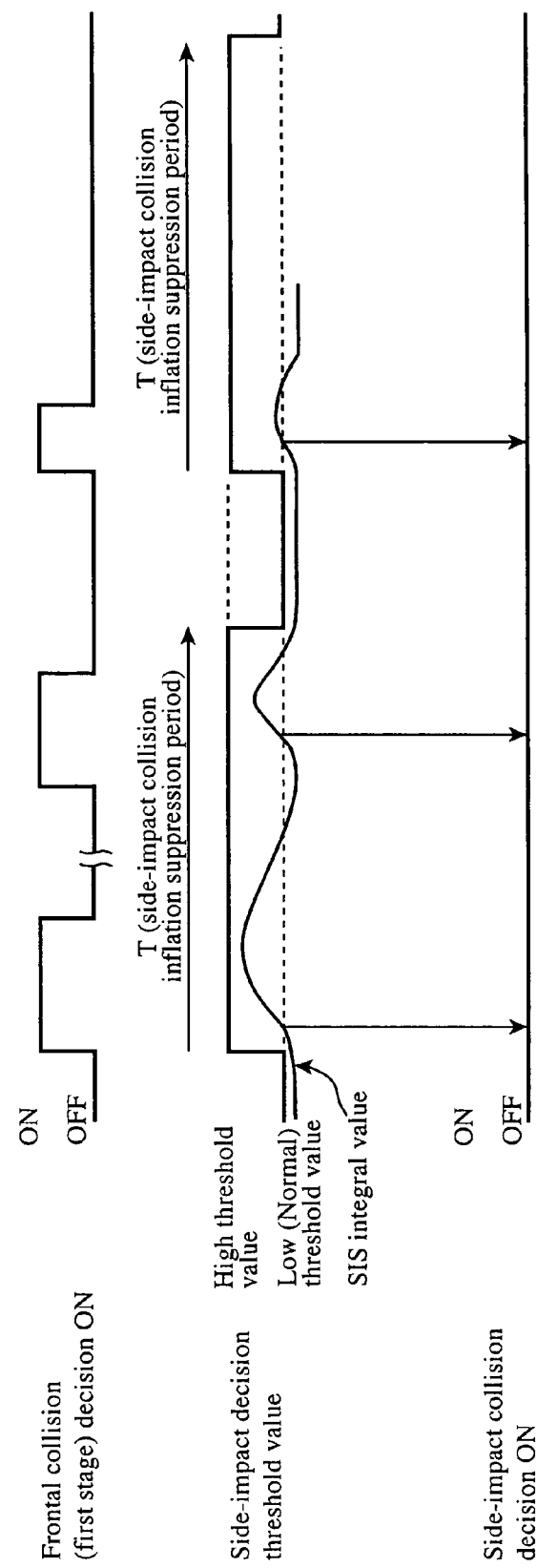
FIG. 5 is a time chart illustrating the operation of the airbag control apparatus of the embodiment 1 in accordance with the present invention.

FIG. 5 is a time chart illustrating timings in the frontal collision.

Generally, in an offset collision or oblique collision, a great impact is applied in the lateral direction of the vehicle after an impact occurs in the longitudinal direction of the vehicle. Accordingly, it is only after the frontal collision decision becomes ON that the arithmetic value of the side-impact collision decision exceeds the predetermined threshold value.

Thus, the present embodiment can prevent unnecessary inflation of the side airbags or curtain airbags in a frontal collision by changing the side-impact collision decision threshold value Vth2 of the comparator 12d from the Low level to the High level and holding the high level for the predetermined period from the time when the frontal collision decision is made ON by using the ON timer processing as illustrated in FIG. 5.

As described above, in a frontal collision, in particular in an asymmetric collision such as an offset collision or oblique collision, a great impact occurs in the lateral direction of the vehicle as well. Accordingly, when the side-impact collision decision threshold value is low, it is likely that the side airbags/curtain airbags inflate at such a timing that the occupants move forward in the vehicle and so no occupant protecting effect is achieved even if the side airbags inflate. The present embodiment, however, can prevent the unnecessary inflation of the side airbags or curtain airbags in the frontal collision by suppressing the side-impact collision decision when a strong impact is applied in the lateral direction in a collision other than the side-impact collision such as the offset collision or oblique collision, thereby being able to reduce useless repair cost imposed on a user.

In addition, the present embodiment can precisely detect the occurrence of a collision other than a side-impact collision (a frontal collision) by using the frontal collision decision as a trigger of the decision suppression of the collision substantially. This makes it unnecessary to add any new logic circuit for the suppression trigger. Furthermore, even during the High level of the threshold value, the side airbags/curtain airbags can inflate if a side-impact collision involving a sufficiently great impact occurs. Moreover, since the threshold value is returned to its original Low level after the predetermined period has elapsed, the side-impact collision decision can be made at proper timing even in a case of a multiple collision where a side-impact collision occurs after a frontal collision. Besides, if it is desired to completely prohibit the side-impact collision decision after the occurrence of the frontal collision, the threshold value of the High level should be set at a sufficiently high value. Thus, the side-impact collision decision can be prohibited in the frontal collision.

In addition, as for the time T (side-impact collision inflation suppression time) during which the side-impact collision decision threshold value in FIG. 5 is kept at the High level, it can be set at a proper value by making it a parameter.

Embodiment 2

Although the foregoing embodiment 1 employs the front-impact sensors as the means for detecting the longitudinal acceleration, this is not essential. For example, the present invention is also applicable to such a configuration that has an acceleration sensor mounted in the main ECU with or without using the front-impact sensors. Alternatively, it is also applicable to a configuration that employs a rear side-impact sensor mounted near a C-pillar as the means for detecting the acceleration. Although the embodiment 1 is described by way of example having two front-impact sensors mounted, the present invention is also applicable to a case having one, three or more front-impact sensors.

INDUSTRIAL APPLICABILITY

As described above, the airbag control apparatus in accordance with the present invention is suitable for preventing the accidental inflation of the side airbags when the occupant protecting effect is small.

What is claimed is:

1. An airbag control apparatus comprising:
an acceleration detector for detecting acceleration in a longitudinal direction and lateral direction of a vehicle;
a collision decision section configured to make a decision about a frontal collision and side-impact collision of the vehicle in accordance with detection outputs of said acceleration detector; and
a driver for inflating front airbags for protecting occupants from the frontal collision and side airbags for protecting the occupants from the side-impact collision, in response to a decision output of said collision decision section, wherein
said collision decision section suppresses the decision about the side-impact collision in accordance with collision information, about the frontal collision in the longitudinal direction of the vehicle, which collision information is included in the detection outputs of said acceleration detector, and an ECU makes a comparison of a derived magnitude of a frontal collision to a threshold magnitude value to generate a feedback communication through a level adjusting means, prior to determining an activation of the collision driver for inflating at least one side air bag, the comparison by the ECU allows for flexible logic circuit implementation with the detection of a collision other than the side impact collision by using the frontal collision decision as a trigger of the decision for suppression of the collision process.

2. The airbag control apparatus according to claim 1, wherein said collision decision section enables the suppression of the decision about the side-impact collision at a point of time when the frontal collision is decided.

3. The airbag control apparatus according to claim 1, wherein said collision decision section suppresses the decision about the side-impact collision by raising a threshold value for deciding the side-impact collision from a normal level to a predetermined level.

4. The airbag control apparatus according to claim 3, wherein said collision decision section returns the threshold value for deciding the side-impact collision, which has been raised to the predetermined level, to the normal level after a predetermined time has elapsed.

5. An airbag control apparatus comprising:
a forward acceleration detector for detecting acceleration in a longitudinal direction of a vehicle;
a lateral acceleration detector for detecting acceleration in a lateral direction of the vehicle; and
a collision decision driver for inflating side airbags for protecting occupants from a side-impact collision by making a decision about the side-impact collision of the vehicle in accordance with the acceleration in the longitudinal direction of the vehicle detected by said forward acceleration detector, and the acceleration in the lateral direction of the vehicle detected by said lateral acceleration detector, and an ECU makes a comparison of the derived magnitude of a frontal collision to a threshold magnitude value to generate a feedback communication through a level adjusting means, prior to determining an activation of the collision decision driver for inflating at least one side air bag, the comparison by the ECU allows for flexible logic circuit implementation with the detection of a collision other than the side impact collision by using the frontal collision decision as a trigger of the decision for suppression of the collision process.

6. The airbag control apparatus according to claim 5, further comprising:
a collision decision driver for making a decision about a side-impact collision of a vehicle by comparing acceleration in a lateral direction of the vehicle with a predetermined threshold value, and for varying the threshold value in accordance with acceleration in a longitudinal direction of the vehicle.

* * * * *